United States Patent [19]

Anderson et al.

[11] 4,234,383
[45] Nov. 18, 1980

[54] ACTINIDE NITRIDE-FUELED REACTOR AND CONTINUOUS METHOD OF OPERATING THE SAME

[75] Inventors: Robert N. Anderson, Palo Alto; Norman A. D. Parlee, Los Altos Hills, both of Calif.

[73] Assignee: Parlee-Anderson Corporation, Redwood City, Calif.

[21] Appl. No.: 905,745

[22] Filed: May 15, 1978

Related U.S. Application Data

[60] Continuation of Ser. No. 438,880, Feb. 1, 1974, abandoned, which is a continuation of Ser. No. 270,305, Jul. 10, 1972, abandoned, which is a division of Ser. No. 825,651, May 19, 1969, Pat. No. 3,843,765.

[51] Int. Cl.² ............... G21C 7/02; G21C 15/00; G21C 19/00
[52] U.S. Cl. ............... 176/37; 423/5; 423/11; 252/301.1 R; 176/49
[58] Field of Search ............... 176/37, 49; 423/5, 754, 423/18, 20, 11; 252/301.1 R

[56] References Cited

U.S. PATENT DOCUMENTS

| | | |
|---|---|---|
| 2,758,023 | 8/1956 | Bareis ............... 176/49 |
| 3,034,889 | 5/1962 | Spedding et al. |
| 3,251,745 | 5/1966 | Teitel ............... 176/49 |
| 3,282,681 | 11/1966 | Knighton et al. |
| 3,284,190 | 11/1966 | Knighton et al. |
| 3,287,093 | 11/1966 | Nelson et al. |
| 3,485,594 | 12/1969 | Knacke |

OTHER PUBLICATIONS

ANL-6648, 1962, pp. 15, 31, 40, 43, 44, 60–64, 80, 110, 111, 115.

Primary Examiner—Harvey E. Behrend
Attorney, Agent, or Firm—Flehr, Hohbach, Test, Albritton & Herbert

[57] ABSTRACT

An actinide nitride-fueled nuclear reactor and a method of operation therefor, including continuous in situ removal of fission products and optional addition of fuel-forming actinide material as the reaction proceeds. The reactor employed has a fuel system comprising a critical mass of a nitride of an actinide metal in contact with a non-critical solution of the actinide metal in a molten metal solvent of low neutron adsorption cross section such as tin, said fuel system being maintained under a nitrogen atmosphere in an inert, refractory vessel such as graphite which is non-conducive to the formation of actinide oxides. Fission products formed are continuously exchanged with the actinide metal dissolved in the molten metal solvent as the nuclear reaction proceeds, with equivalent amounts of actinide nitride being formed and precipitated into the critical mass as fission products are dissolved in the molten metal solution. Temperature excursions tend to be suppressed by the nitride decomposition which ensues as temperatures are increased without any balancing increase in nitrogen pressures to restore the equilibrium.

7 Claims, 3 Drawing Figures

ACTINIDE NITRIDE-FUELED REACTOR AND CONTINUOUS METHOD OF OPERATING THE SAME

This is a continuation of application Ser. No. 438,880, filed Feb. 1, 1974, now abandoned, which is a continuation of application Ser. No. 270,305, filed July 10, 1972, now abandoned, which is a division of application Ser. No. 825,651, filed May 19, 1969 (now U.S. Pat. No. 3,843,765.).

BACKGROUND OF THE INVENTION

The current method of making nitrides of uranium is an extremely complicated one which requires that the pure metal be first obtained by appropriate reduction steps. The metal is then converted to a fine powder by successive hydriding and dehydriding operations and the powder is finally nitrided under controlled temperature and pressure conditions. It is an object of this invention to provide a method for obtaining uranium nitrides which is more convenient than any known method, a further object being to provide an equally attractive method for converting said nitrides back to uranium metal.

The long-term operation of the present actinide-fueled reactors is seriously handicapped in that the fuel must be removed and repurified after relatively small amounts of fuel, e.g., about 0.1 to 2.0 percent, are burned. While this disadvantage can in part be minimized by over-sizing the reactor so as to provide for an unnecessarily large concentration of fuel, this is obviously an uneconomic expedient. In repurifying the fuel, wet-chemistry or pyrometallurgical methods have been utilized. Current wet-chemistry separations require long periods of radioactive cooling for the radioactivity to decay, followed by a series of complexing, chelation and ion exchange steps which generate considerable quantities of radioactive wastes. Disposal of the latter poses a serious problem.

It is recognized that pyrometallurgical purification methods should be used if at all possible since they are fast and do not require the use of long radioactive cooling periods. However, no practical pyrometallurgical method has been developed which is as effective as the wet-chemical methods. For example, the complicated schemes proposed for extracting various of the metal impurities with liquid metal or a molten salt result in the loss of a significant amount of the fuel material. It has also been proposed to convert the metals to fluorides and then to distill off the uranium present in the form of uranium hexafluoride. This method has the disadvantages that one is working with toxic and corrosive gases and that the method requires expensive processing equipment for its operation. It is, therefore, a further important object of this invention to provide a pyrometallurgical method for reprocessing and purifying any type of actinide fuel (whether metal, oxide, sulfide, carbide, silicide or nitride, for example) which is contaminated with fission products, said method being fast, safe of operation, inexpensive and highly efficient from a fuel recovery standpoint, while also providing a highly concentrated radioactive waste product.

A still further object of the invention is to provide a novel reactor system and process of operating the same which permits of the continuous and automatic in situ removal of fission products, including those of a gaseous nature, as the operation continues; which similarly permits of the addition of new fuel components (including fertile materials, if desired); and which in one embodiment thereof is inherently stable and safe of operation in the sense of being self-correcting as reaction temperatures rise or fall from equilibrium levels. Another object is to provide a method which permits uranium to be separated from plutonium when the latter is present in relatively small amounts.

SUMMARY OF THE INVENTION

The present invention is based on the provision of a novel nuclear reactor having a fuel system comprising a critical mass of a nitride of an actinide metal which is in contact with a non-critical solution of the actinide metal in a molten metal solvent of low neutron absorption cross section such, for example, as tin, said fuel system being maintained under a nitrogen atmosphere in an inert, refractory material such as graphite which is non-conducive to the formation of actinide oxides or other non-nitride products. This nitrogen atmosphere is one of nitrogen alone or of nitrogen admixed with argon or other inert gas, and the partial pressure of nitrogen therein is maintained at a level, usually from about 0.02 to 2 atmospheres, which meets equilibrium requirements to provide the requisite mass of actinide nitride at the prevailing conditions of dissolved actinide concentration and reactor temperatures. The latter may range from about 300° to 2000° or more depending on the nature of the actinide nitride employed.

The term "nitrogen pressure", as employed herein, is synonymous with "nitrogen partial pressure", it being recognized that argon or other similarly inert gas will in many cases be employed along with the required nitrogen to avoid maintaining a partial vacuum in the reactor and other portions of the system, or as an aid to providing positive pressures therein.

It is an important feature of the present invention that as the reactor remains in operation under the conditions described above, the critical mass of actinide nitride constantly frees itself of the fission products formed during the fission reaction. Thus, when a uranium fuel atom fissions, the nitride is destroyed and there are formed nitrogen and gaseous fission products as well as metal fission products. Also formed are neutron capture decay products such as plutonium which also go into solution in the molten metal for later separation from the uranium, if desired. The fission product gases so formed have low solubility in the molten metal and pass into the nitrogen atmosphere. The metal fission products dissolve in the molten solvent metal, said products not being converted to nitrides at the extremely low concentration levels which are here involved. At the same time, the nitrogen released during fission reacts with an equivalent amount of dissolved actinide metal which is present at a much higher concentration than the metal fission products, to reform the precipitated nitride and thus maintain the reactor under the desired equilibrium conditions. In equilibrium the fuel system is maintained under an atmosphere of nitrogen under conditions of nitrogen pressure and of temperature conducive to maintaining the fuel system at the desired temperature as fission occurs and heat is withdrawn from the reactor. It will thus be seen that in this fuel repurification step, which occurs automatically and in situ, fission products are continuously flushed away from the actinide nitride fuel material which remains essentially constant in amount, it being possible that some slight shift in the equilibrium values presented herein may occur under prolonged conditions of intense radiation.

In order that the fission products may rapidly leave the actinide nitride mass, it is necessary that there be good contact between the nitride and the molten metal solution, and this condition is that which will normally be present. However, if desired, intermixing of the nitride particles with said solution can be reinforced by mechanical means such as a graphite stirrer or the like. Moreover, if a gradual buildup of fission products should occur in the area of the actinide nitride mass, this condition could be overcome (in the case of the uranium nitride fuel UN, at least) by temporarily reducing nitrogen pressures and thereby bringing a certain amount of actinide back into solution along with the fission product metals. Therefore, as pressure is restored to normal operating levels, the full amount of the nitride mass is restored while the fission products remain in solution. This pumping action could be repeated from time to time, as required.

To facilitate the entry of the fission products into the molten metal solution which is in intimate contact with the actinide nitride mass, as discussed above, it is also necessary that there be present an amount of the molten metal solution, relative to the amount of actinide nitride present, which is adequate to facilitate rapid removal of the fission products from the actinide nitride mass as the reactor continues in operation. While the relative amount of the molten metal solution to be employed will vary from one reactor system to another, depending on reactor shape and other factors, good results can be obtained by using from about 3 to 20 parts by weight of the molten metal solution for each part by weight of the actinide nitride. The invention is operable using even smaller relative amounts than this of the molten metal solution, though the ability of the solution to take up the fission products becomes progressively more limited as the proportion of molten metal to actinide nitride becomes further reduced. Conversely, the invention is readily operable using more than 20 parts by weight of the molten metal solution for each part by weight of actinide nitride, the upper limit for any given reactor system being a function of economics and of overall reactor design characteristics.

It is a unique feature of the reactor hereof that, due to the dilution factor present, the actinide present in solution in the molten solvent metal does not become critical. Instead, criticality occurs when an appropriate mass of the actinide nitride becomes situate in the graphite reactor cavity. This critical condition can be effected either by adding actinide nitride to the system or by precipitating actinide nitride from the molten metal solution as suitable departures from equilibrium conditions are made. For example, increasing the nitrogen pressure within the system above the given point (for any given temperature and fuel concentration) which induces the actinide fuel to precipitate from solution in nitride form will accomplish the desired result. In this method the cumulative precipitation can continue, depending on the nitrogen partial pressure, until a critical actinide nitride mass is obtained. The entire operation of bringing the reactor on stream can be smoothed by making suitable adjustments in the nitrogen pressure, as required to maintain the system under equilibrium conditions at the desired temperature and fission levels. Further temperature control can be achieved by the use of the conventional moderator and control rods which can be employed in conjunction with the reactor. Temperature control can also be achieved by the use of moderating nitrides (e.g., samarium nitride) in the core mass.

In employing the reactor of the present invention, good results can be obtained by using nitrides of any one of a variety of actinide metals including uranium$^{233}$, uranium$^{235}$ and plutonium$^{239}$, as well as mixtures thereof. These fuel materials are preferably added to the system in the metallic or the nitride form. However, they can be introduced as the oxide, sulfide, carbide or silicide compounds, if desired, provided that the compound employed is one which is capable of being taken up in some fashion by the tin or other molten solvent metal employed and which is capable of being converted to a nitride in the presence of a nitrogen atmosphere, as described herein. When employing such non-nitride compounds it is important that any gaseous by-product formed, e.g., carbon monoxide (from the reaction $UO_2(s) + 2C(s) + \frac{1}{2}N_2(g) = UN(s) + 2CO(g)$), be swept out of the system by the nitrogen atmosphere which is maintained over the molten solution present in the reactor. Here, as well as elsewhere herein, the symbols (s) and (g) refer to materials which are in the solid or the gaseous state, respectively. It is also important that the actinide metal and the solvent metal be in a condition, such as that obtained by particulate-blasting or mechanically cleaning all surfaces in an argon atmosphere, or by other physical cleaning methods, to successfully form the actinide-tin alloy. The use of acid or organic degreaser cleaning baths is not satisfactory in most instances and, in the case of uranium, for example, slows said metal from dissolving in tin even though the temperature exceeds the uranium melting point.

In addition to the fuel which is introduced into the reactor, it is also possible to employ fertile actinide materials such as U$^{238}$ or Th$^{232}$. The reactor is ideal for breeder operation because of the nature of the nitride core mass, and it can be operated as a breeder by adding the fertile materials either to the molten metal present in the reactor or to a recycle or cleanup stream of said molten metal material. As the added fertile material transmutes to fuel, the latter will behave as the remaining fuel material does toward nitrogen, albeit subject to its own equilibrium behavior as determined by its concentration and the other environment factors.

The concentration of actinide metal to employ in the molten metal solution contained in the reactor can vary over a relatively wide range and will depend in large degree on the extent to which the uranium or other actinide metal is to be withdrawn from the solution rather than being added to the system in nitride form. Assuming that the desired critical mass of actinide nitride is present, the lower concentration limit is such as to provide a small percentage (e.g., 1 to 3%) of actinide dissolved in the molten solvent. While the upper concentration limit is determined somewhat by economic factors, good results can be obtained with systems wherein the molten metal solution overlying the actinide nitride contains as much as 10 to 20 percent of dissolved actinide. In the preferred practice of the invention, the reactor, in addition to the precipitated critical mass of actinide nitride, will contain from about 2 to 10 percent by weight of dissolved uranium or other actinide fuel metal, such amounts facilitating an effective interchange between fission products moving into the molten metal and actinide reprecipitating from solution into the actinide nitride mass.

The heat generated by the reactor can be extracted by conventional heat exchange methods as now employed in the art. Moreover, the present reactor lends itself to practices wherein the molten metal solution of actinide can be circulated through heat exchange means to effect part or all of the desired cooling action. Such withdrawal of heat from a circulating stream of the molten metal solution can be practiced as the latter is being directed to, or is returning from, a purification step wherein dissolved fission products are removed from the solution.

In the preferred practice of this invention, tin is employed as the molten solvent metal in the reactor inasmuch as it has a low neutron absorption cross section and otherwise best meets the solvent metal requirements. However, other metals such, for example, as lead or bismuth can be used. Also various alloys of these metals (e.g., Sn—Pb or Sn—Bi) can be employed. The requirements of the solvent metal are that it have good solubility for uranium or other actinide metal employed; that it does not itself readily form nitrides; that it have a tendency at lower temperatures to form inter-metallic compounds with the actinide present in the solution; and that it have a suitably low neutron absorption cross section. Tin meets all these requirements in an ideal fashion, and it has the further advantage of having low solubility for non-nitrogen gaseous fission products.

The nature of the reactor vessel employed to contain the actinide nitride-molten metal fuel system hereof is of critical importance. Thus, the vessel must be highly refractory in character and capable of containing the system at temperatures well above reaction temperatures, for the sake of safety. It also must be inert and have no tendency to interact with the actinide metal to produce oxides, or other non-nitride compounds, at the reactor temperatures employed. Lastly, the vessel should have low neutron absorption characteristics. Graphite has been found to meet these requirements in an ideal fashion, and it therefore is the preferred material for employment herein to contain the fuel system. However, other inert refractory materials can be employed such, for example, as beryllium carbide, silicon carbide, titanium carbide and calcium fluoride, the latter material being employed only with relatively low temperature operations.

In view of the foregoing factors and in the interest of clarity and simplicity of expression, the present invention will in most instances be hereinafter described in terms of a system where tin is employed as the molten solvent and graphite is used to contain the fuel system. Similarly, inasmuch as uranium is commonly employed in nuclear reactors and constitutes the preferred fuel for use in the present operation, the invention will hereinafter be described in most instances as it relates to a uranium nitride reactor system of either the UN or the $U_2N_3$ variety.

Uranium, when dissolved in molten tin (or other appropriate metal) under an atmosphere having a nitrogen partial pressure of the order of at least about 0.02 atmospheres, can exist in the system in part or essentially in whole either as UN or as $U_2N_3$, depending on the temperature and uranium concentration within the system. In general, the solid $U_2N_3$ product is that which is formed at temperatures of about 300° to 1480° C., the lower portions of this temperature range being practicable only when using systems wherein the amount of uranium dissolved in the molten tin, because of its limited solubility at low temperatures, is relatively small.

The UN product is that which is formed at temperatures above about 1485° C., and it is capable of remaining in the system at temperatures of 2000° C. or higher, under appropriately high nitrogen pressure and solution concentrations.

Figure 1:
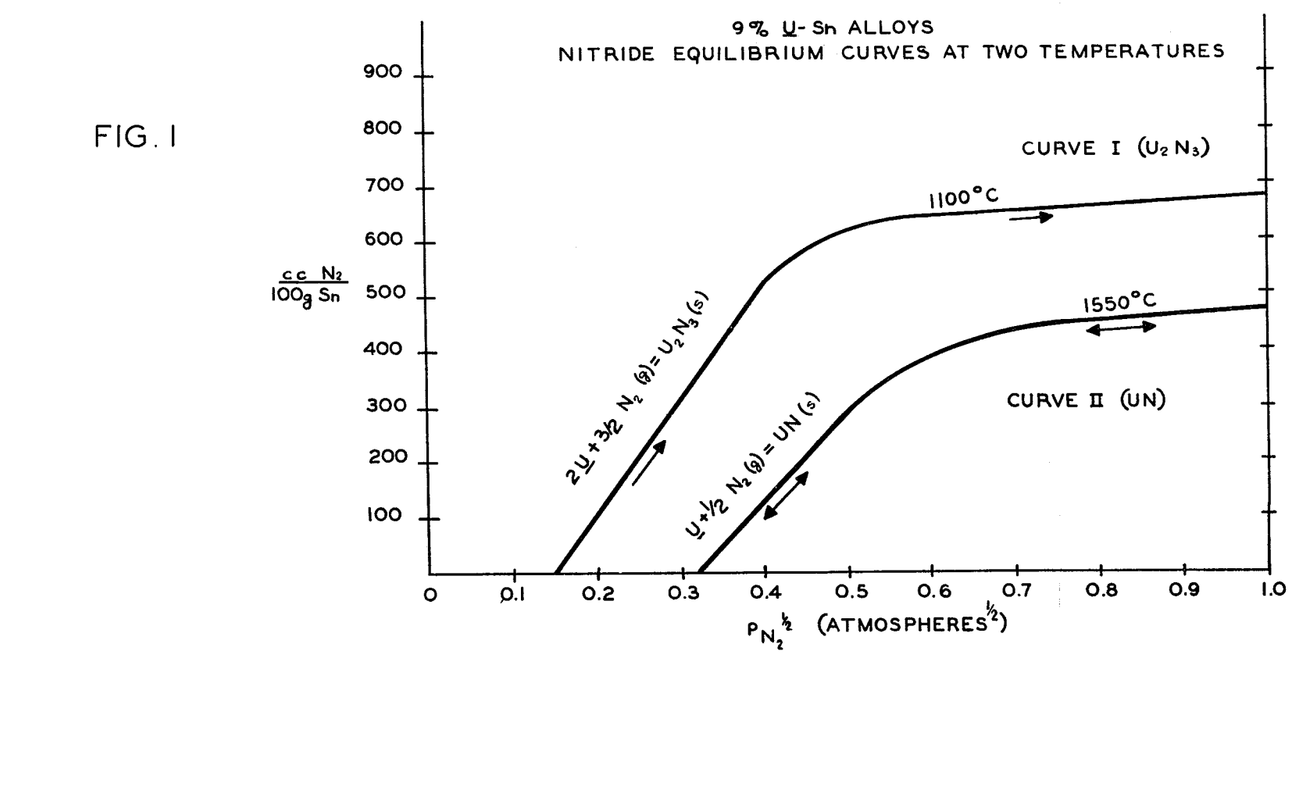

The respective equilibrium curves for a $U_2N_3$-Sn-$\underline{U}$ system maintained at 1100° C. and a UN-Sn-$\underline{U}$ system maintained at 1550° C., each containing a total of 9 percent uranium, are shown in Curve I and in Curve II in FIG. 1 of the drawings wherein nitrogen content is plotted against $\sqrt{N_2}$ pressure. Here, as well as elsewhere herein, the symbol "$\underline{U}$" represents dissolved uranium. The two systems do not respond in the same manner to changes of nitrogen pressure. Thus, as indicated by the arrows shown alongside said curves, the UN system of Curve II is reversible and responds rapidly to pressure change. The $U_2N_3$ system of Curve I, on the other hand, is not reversible except possibly when the system is maintained for long periods of time. Specifically, while increasing the nitrogen pressure (i.e., the nitrogen partial pressure, as noted above) will shift the equilibrium to the right in Curve I, a lowering of nitrogen pressure is without any substantial effect until pressures are reduced to a very low level, at which point nitrogen gas is evolved and the product is converted to the UN form. Furthermore, while the UN system is responsive to temperature changes, this is not notably the case with the $U_2N_3$ system as indicated by the data presented in ensuing paragraphs. For this reason, when working within the temperature range productive of $U_2N_3$, fine control of temperature is made by the use of neutron-poison control rods, whereas the UN system is self-correcting in the sense that temperature excursions induce rapid decomposition of portions of the critical UN core mass until equilibrium is reached. The converse is true of systems which become abnormally cool due to undue withdrawals of heat from the system for here the UN content builds up, with a resultant increase in evolved heat, until equilibrium is reached. For these, as well as other reasons, the present invention in its preferred embodiment is practiced using a UN critical mass. The foregoing difference in behavior between the respective $U_2N_3$ and UN systems has substantially no influence on the ability of the system to continuously regenerate itself by expelling metal fission products into the overlying molten tin solutions and gaseous fission products into the nitrogen-containing atmosphere maintained above the tin-uranium melt.

The temperature response equation for the UN equilibrium $U\underline{N}(s) = \underline{U} + \frac{1}{2}N_2(g)$ is as follows:

$$\log K_1 = -7700/T + 4.37,$$

wherein the equilibrium constant $$K_1 = a_{\underline{U}} \cdot P_{N_2}^{\frac{1}{2}}$$

and wherein $a_{\underline{U}} = \%\underline{U} \cdot f_{\underline{U}}$ and $\log f_{\underline{U}} = -0.0305 \cdot \%\underline{U}$. (All logs herein are to the base 10.)

In the foregoing equation as well as elsewhere herein, the symbol $a_{\underline{U}}$ represents the activity of the dissolved uranium, $\%\underline{U}$ represents the weight percent of $\underline{U}$ in solution, $f_{\underline{U}}$ represents the activity coefficient of the dissolved uranium, p represents the partial pressure of nitrogen in the system in atmosphere, and T represents temperature in degrees Kelvin.

For the $U_2N_3$ equilibrium, $U_2N_3(s) = 2\underline{U} + 3/2N_2(g)$, the temperature response equation is as follows:

$\log K_2 = -830/T - 1.2,$
wherein
$K_2 = a_{\underline{U}}^2 \cdot p_{N_2}^{3/2}.$ Here $\log f_{\underline{U}}$ is not linear with increasing uranium concentrations due to the buffering effect of intermetallic compounds of uranium and tin such as $USn_3$ which are present at higher uranium concentrations, $f_{\underline{U}}$ being 0.38 at 5%$\underline{U}$-Sn and 0.24 at 9%$\underline{U}$-Sn.

It will be seen from the equations presented above that the equilibrium constant ($K_2$) which prevails for the formation of $U_2N_3$ is much less temperature sensitive than is the similar constant ($K_1$) which prevails for systems formative of UN.

If a $U_2N_3$ system is for any reason brought above a level of about 1485° C., it will evolve nitrogen gas and the $U_2N_3$ present will be converted to the UN product in accordance with the equation $U_2N_3(s) = 2UN(s) + \frac{1}{2}N_2(g)$. The system will then follow the characteristics exemplified by Curve II of FIG. 1. On the other hand, when a UN system is cooled below 1485° C., the UN material present will be converted to the $U_2N_3$ product. Should insufficient nitrogen be present to effect this transition, a portion of the UN will be converted to $U_2N_3$ while the remainder will dissociate and supply uranium to the molten tin solution. The system will then follow the typical $U_2N_3$ pattern of Curve I.

As seen from the above discussion, it is possible to operate a given reactor using either $U_2N_3$ or UN as the fuel. Moreover, it is possible to operate so that the system can be shifted from one to the other of these materials by making appropriate changes in temperature. However, the characteristics of the respective $U_2N_3$ and UN systems differ from one another in significant particulars, as set forth more fully below.

In a preferred practice of this invention, the reactor is operated either in about the 1500° to 2000° C. (or higher) temperature range which ensures the presence of the UN fuel, or at a lower level ranging from temperatures of something above the melting point of the molten tin-uranium solution (e.g., 300° C.) to temperatures somewhat below a level of about 1485° C. which appears to be the delineating temperature between the respective UN and $U_2N_3$ systems. More preferably, the process is operated at temperatures above about 1500° C. with a UN fuel inasmuch as greater flexibility of operation is obtained when working with this material.

DETAILED DESCRIPTION OF THE INVENTION

The UN System

It has been discovered that the equilibrium characteristics of the $\underline{U}$-Sn-UN-system are such as to permit of a ready shift in either the UN or the $\underline{U}$ direction as nitrogen pressures, temperatures or solution concentration are changed. Thus, for any given concentration of dissolved uranium ($\underline{U}$) in the molten tin or other solvent metal solution, raising the nitrogen pressure or lowering the temperature will tend to increase the relative amount of the precipitated UN fuel which is present. Similarly, the greater the concentration of the $\underline{U}$ in the molten metal, the larger the mass of UN. The significance of the factors of pressure and $\underline{U}$-concentration on the equilibrium state is exemplified by the data presented in Table I below for a system maintained at 1550° C.

TABLE I

| Nitrogen Pressure (In Atm.) | Kg Uranium Precipitated as UN at 1550° C. From 100 Kg of Molten Solution of Indicated Initial Weight Percent Uranium in Tin | | | |
|---|---|---|---|---|
| | 18% | 9% | 5% | 2% |
| 1.0 | | | | 1.1 |
| 0.9 | | | | 0.4 |
| 0.6 | 14.4 | 8.4 | | |
| 0.5 | 14.1 | 8.1 | | |
| 0.4 | 13.3 | 7.7 | | |
| 0.3 | 10.4 | 6.5 | 2.2 | |
| 0.2 | 6.4 | 3.8 | 0.06 | |
| 0.1 | 1.0 | 0.04 | | |

Similarly, the influence of temperature on the equilibrium of a typical $\underline{U}$-Sn-UN system at various nitrogen pressure levels is illustrated by the data presented below in Table II.

TABLE II

| Temperature (°C.) | Kg Uranium Precipitated as UN From 100 Kg of a Molten Solution of 9% Uranium in Sn at Indicated Nitrogen Pressures | | | | |
|---|---|---|---|---|---|
| | .09 atm | .122 atm | .16 atm | .202 atm | .25 atm |
| 1552 | .58 | 2.05 | 3.46 | 4.80 | 6.21 |
| 1567 | | 1.05 | 2.48 | 3.92 | 5.46 |
| 1590 | | | 1.38 | 2.82 | 4.21 |
| 1610 | | | | 1.53 | 2.98 |

While the tables given above present illustrative data for particular systems, the relationships expressed in the temperature response equation given above for $K_1$ can be employed to determine any one of the variables affecting equilibrium, i.e., the point at which UN will just begin to precipitate from a given system, when the other variables are held constant. For example, the equilibrium pressure of nitrogen required to just initiate UN formation in a 12% solution of uranium in tin at 1600° C. (1873° K.) can be determined as follows:

At 1873° K., $\log K_1 = 0.26$; therefore $K_1 = 1.82$.
At 12% $\underline{U}$ level, $\log f_{\underline{U}} = -0.366$; therefore $f_{\underline{U}} = 0.431$ and $a_{\underline{U}} = 5.18$.
Finally, $1.82 = 5.38 \cdot p_{N_2}^{\frac{1}{2}}$; therefore $p_{N_2} = 0.114$ atmosphere.

In view of the temperature sensitivity of the $\underline{U}$-Sn-UN system, and assuming generally constant $\underline{U}$ solution concentrations and the maintenance of constant nitrogen pressures, the system will automatically correct for any temperature excursion attributable to cooling system failure or the like by bringing a portion of uranium in the UN critical mass back into solution, thereby reducing the amount of UN fuel present in the reactor. Conversely, as the temperature of the molten metal solution falls as, for example, when unusual power demands are being made on the unit, additional UN fuel will be formed as required to re-establish the equilibrium temperature for which the reactor has been programmed. Thus, the unit is essentially self-regulating as temperature swings from the equilibrium value in either direction, with control and moderator rods being built into the unit as a precautionary measure for emergency use.

The moderating or correcting effect which is inherent in the reactor as the temperature departs one way or the other from the equilibrium value serves to make the reactor output inherently stable and constant. Similarly, it can be noted that changes in nitrogen pressure away from the equilibrium value affect the other equilibrium factors. Thus, an increase in pressure will induce a temperature rise which, in turn, will cause a portion of the UN fuel to revert to $\underline{U}$ and nitrogen, thereby holding the reactor output essentially constant. On the other hand, as the nitrogen pressure is lowered no compensating factors are at work and the reactor will tend to shut down due to UN decomposition. This will be clear from a study of the illustrative data presented in Curve II of FIG. 1. For example, as the nitrogen pressure (i.e., partial pressure) is lowered from 1 atmosphere to approximately 0.1 atmosphere, the dissolved uranium content in the molten tin solution increases from a level of about 0.43% to one approaching 9.0%, said increase being accompanied by a corresponding decrease in the amount of UN present.

The $U_2N_3$ System

In carrying out the method of this invention with a $U_2N_3$ fuel, operations are necessarily restricted to temperatures ranging from about 300° C. to a level below about 1485° C. The lower level within this range is set by the temperature required to dissolve the desired percentage of uranium, while the upper limit corresponds to the temperature at which conversion of the $U_2N_3$ to UN begins to occur. Working within this range, temperature excursions have little damping effect. Conversely, undue cooling of the system will induce little added buildup of $U_2N_3$. This lack of any high degree of sensitivity to temperature changes manifested by the $U_2N_3$ system is borne out by the data presented below in Table III.

TABLE III

| Temperature (°C.) | Kg Uranium Precipitated as $U_2N_3$ From 100 Kg of a Molten Solution of 9% Uranium in Tin at Indicated Nitrogen Pressure | | |
|---|---|---|---|
| | 0.025 Atm. | 0.05 Atm. | 0.1 Atm. |
| 637 | 1.14 | 3.00 | 5.67 |
| 867 | 0.64 | 2.43 | 5.10 |
| 1100 | 0.25 | 2.04 | 4.60 |
| 1152 | | 1.92 | 4.34 |

As indicated by Curve I of FIG. 1, pressure does play an important role in the $U_2N_3$ system in that an increase of the nitrogen pressure induces a greater precipitation of the $U_2N_3$ product. On the other hand, a decrease in nitrogen pressure does not induce re-solution of any significant portion of the uranium present as $U_2N_3$, this reaction being very slow. It is to be noted, however, that a reduction in nitrogen pressure to levels below about 0.002 atmosphere will induce a gradual conversion of the $U_2N_3$ to the UN product.

The significance of increasing nitrogen pressures on the equilibrium state is evidenced by the data presented below in Table IV for typical $\underline{U}$-Sn-$U_2N_3$ systems at a constant temperature of 1100° C.

TABLE IV

| Nitrogen Pressure (In Atm.) | Kg Uranium Precipitated as UN at 1100° C. From 100,Kg of Molten Solution of Indicated Initial Weight Percent Uranium in Tin | | | |
|---|---|---|---|---|
| | 18% | 9% | 5% | 2% |
| 0.025 | 0.99 | 0.25 | | |
| 0.05 | 3.02 | 2.04 | 0.81 | 0.28 |
| 0.10 | 5.80 | 4.60 | 2.02 | 0.77 |
| 0.20 | 9.75 | 7.46 | | |
| 0.30 | 12.82 | 8.05 | | |
| 0.40 | 15.30 | | | |

In view of the impracticability of controlling a $U_2N_3$ fueled reactor by modifications of pressure and/or temperature, fine control of temperature is made by the use of neutron-poison control rods. In other respects the manner of operation of the $U_2N_3$ system is very much the same as that of a reactor fueled with UN. In either case, fission products leave the critical nitride mass as soon as they are formed, with an equivalent amount of uranium being precipitated from the tin solution to keep the mass constant. However, the step of cleaning up the nuclear fuel outside the reactor may be conducted at temperatures above those employed in the $U_2N_3$ reactor system, especially when the process is to include a step of denitrifying a uranium nitride-tin system to $\underline{U}$-Sn. The latter conversion step occurs readily at low nitrogen pressures and at temperatures above 1485° C. where the nitride present is UN.

Method of Reactor Startup and Operation

The manner of starting up and thereafter operating a reactor is essentially the same using either $U_2N_3$ or UN fuel. Both systems require the addition to the system and/or the precipitation therein of a critical uranium nitride mass. If the nitride is to be precipitated from solution, the contents of the reactor can be heated to the desired temperature in either the $U_2N_3$ or the UN range, as the case may be, with nitrogen pressures being raised to levels calculated to induce precipitation of the required amount of nitride to establish the desired critical mass within the reactor.

In the case of a $U_2N_3$ system, once the reactor is on stream and fission is occurring, the nitrogen pressure is held at the previously established or even at a lower level as the reactor continues indefinitely in operation, the pressure being raised, of course, when it is desired to permanently increase the critical mass of nitride present. This same result can be achieved by increasing the concentration of uranium in the molten metal solution present in the reactor. Neutron absorbing rods are employed as the primary means for controlling reaction temperatures.

The UN system is sufficiently flexible so that, if desired, the weight of the critical mass which is present can be increased or decreased as the nitrogen pressure is correspondingly raised or lowered. Here again, increasing the uranium concentration in the molten metal solution will also effect a net increase in the amount of UN which is present, other conditions remaining the same. Similarly, diluting the uranium concentration by addition of further increments of tin or other molten solvent metal will decrease the net UN mass. With the UN system, neutron absorbing rods are employed primarily as added safety features, they normally being withdrawn during periods of startup and regular operation, and then inserted into the high flux region when the operation is to be shut down or otherwise moderated.

Removal of Fission Products

It has been noted above that the critical mass of uranium or other actinide nitride does not become appreciably contaminated with fission products. Instead, the zirconium, various lanthanide and other fission metals formed enter the melt, i.e., the molten portion of the system, while the gaseous fission products other than nitrogen (which immediately reacts with dissolved uranium to precipitate a uranium nitride) pass into the nitrogen atmosphere which is maintained above the melt. It forms a feature of this invention that these fission product metals and gases can be intermittently or continuously removed from the reactor system and disposed of in a condition essentially free of contamination by the actinide metal or any compound thereof. Moreover, while the waste materials thus separated are radioactive, their disposal presents no particular problem inasmuch as the volume of the waste has been reduced by the present method to a very low level.

In the portions of this description to follow, information is given as regards appropriate apparatus and methods for use in separating fission product contaminants from the solution of molten metal which is maintained in the reactor. However, it should be noted that even without the practice of any external cleanup step for removing fission products from the molten metal solution, the process of the present invention constitutes an advance of major proportions in the art. Thus, while the solid fuel elements presently employed in conventional reactors must be withdrawn for repurification after but from about 0.1 to 2.0% by weight of the fuel has undergone fission, the present operation, with the fission products leaving the core and dissolving in the molten metal solution, provides a method whereby a core mass of given weight can be employed for periods which are at least 10 times longer than would otherwise be possible with conventional reactors before the fission products build up in the molten metal solvent to a level which retards their rapid and complete entry into solution therein. When the method hereof is extended to include external cleanup of the molten solvent portion of the system, the operation can be continued ad infinitum, particularly when added elements of fuel or fertile materials are added to the reactor as required to make up for fission losses.

In the case of metal fission product contaminants present in the molten metal, separation thereof can be effected externally of the reactor by providing the portion of the melt to be purified, as contained in a graphite vessel or one fabricated from some other refractory material which will not interact with dissolved uranium, with a nitrogen atmosphere while adjusting the melt temperature and the nitrogen gas pressure so as to precipitate out the dissolved uranium or other actinide metal in the form of a nitride. Thus, it has been found that in carrying out a uranium nitride precipitation step during the purification treatment, the nitride of zirconium (one of the most prevalent fission product metals) does not begin to form until the activity of the uranium in solution has been reduced to a very low level. Further, despite the fact that nitrides of uranium and zirconium, as well as those of certain other compounds of these metals, normally have many of the same physical and chemical properties, it has now been found that when the system reaches the point where solid zirconium nitride does begin to form, it floats on the molten tin solution rather than sinking to the bottom thereof in the fashion of the solid uranium nitrides. The latter products whether in the UN or in the $U_2N_3$ form, can thus be removed from the melt either before or after any zirconium nitride solid has appeared. This removal of uranium nitrides can be effected by physically removing the solid uranium nitride particles from the molten metal solution by any appropriate means such, for example, as an entraining device as a moving belt or the like having a surface so contoured as to carry the solid particles along with it for subsequent discharge as it leaves the molten metal solution. The nitrification of the residual molten metal portion of the system can then be continued under conditions of relatively low temperature and high nitrogen pressures, or partial pressures, which are found to favor the formation of solid fission product nitrides, some of which float on the surface of the melt along with the zirconium nitride, while others such as niobium nitride and some of the lanthanide nitrides sink to the bottom of the system. Whatever their position of rest with respect to the molten metal component, all such solid fission metal nitrides can be removed from the system for disposal. Such disposal poses minimal difficulties since the overall volume of the separated fission product nitrides is extremely small.

At this point, the tin or other solvent metal is essentially "clean" and can be returned to the reactor system. However, if even further purification is desired, any fission elements which may still remain in the molten metal material can be separated out by the practice of appropriate distillation or fractional distillation procedures. Thus, any products formed from tin due to neutron irradiation or decay such as antimony, and which may be present in a molten tin body, can be removed in this fashion since such products have boiling points which differ from that of tin.

The solid uranium nitride recovered in the purification step can be returned as such to the reactor or it can be converted to uranium metal by adding it to a bath of molten tin which is maintained above about 1485° C. under relatively low nitrogen pressures of the order of 0 to 0.2 atmosphere, a treatment which will decompose the nitride and cause the pure uranium metal to be dissolved in the molten tin, as shown in Curve II of FIG. 1. To avoid the necessity of maintaining a partial vacuum over the system during this denitriding step, the nitrogen gas can be admixed with argon or other inert gas in such amounts as to provide the requisite nitrogen partial pressures. Once the conversion of uranium nitride to dissolved uranium metal is complete, the tin can be stripped away from the uranium by conventional means such as evaporation, distillation in vacuo or the addition of magnesium to form a molten tin-magnesium phase which can be physically separated from the molten uranium phase.

Inasmuch as the operations described above for the recovery of uranium involve denitrification rather than nitrification of the actinide metal, it is not necessary that the reaction be conducted in a graphite or other inert vessel, though graphite containment is preferred. Instead, resort can be had to the use of other refractory materials when, for example, the operation is conducted using the so-called "skull" technique in which the vessel walls are cooled to induce the formation of a thin solid layer against the wall, while the remaining portions of the material are maintained at the required temperatures. Here the tin could be vaporized off from the skull, leaving molten uranium which could then be allowed to solidify in the vessel or be poured away therefrom.

The general method of separation described above for separating uranium from fission product contaminants can also be employed to separate uranium from plutonium and both from said contaminants. Thus, assuming a molten tin solution containing an appreciable quantity of uranium and lesser quantities of plutonium and, for example, zirconium, the practice of selective nitrification would first induce the precipitation of uranium nitrides which could be removed. Continued, more vigorous nitrification of the solution would then convert both the plutonium and the zirconium to solid nitride products. The plutonium nitride formed would separate out at the bottom of the tin solution and could be recovered therefrom, while the zirconium nitride would float on the molten tin and could be separately removed. The plutonium nitride could then be decomposed to the pure plutonium or a solution of the plutonium in molten tin could be formed in a fashion similar to that employed with uranium, following which the tin could be distilled away from the remaining plutonium metal.

The foregoing purification method by which uranium or other actinide fuel metal is recovered from a system which contains said metal in admixture with metal fission products is one of wide application and can be practiced not only with the reactor system of the present invention but with other contaminated fuels as well. Specifically, a conventional uranium or uranium oxide fuel of the solid type which is contaminated with fission products can be repurified by the method of this invention, a representative equation being $UO_2(s) + 2C(s) \pm \frac{1}{2}N_2(g) = UN(s) + 2CO(g)$. The process is essentially the same as that described above and entails adding the fuel rods or pellets to a bath of molten tin or other suitable solvent metal such as lead or bismuth and then converting the actinide to the insoluble nitride form for removal as such from the residual portions of the mixture. This step is preferably conducted using graphite containment or a vessel having a composition such that it will not react with the actinide metal under the nitriding condition employed. In the case a non-graphite vessel is used to convert actinide oxides to actinide nitrides, then carbon must also be added to the molten metal in order that the oxygen present may be converted to carbon monoxide and thus withdrawn from the system as it is displaced with the nitrogen atmosphere. In any event, the recovered actinide nitride (if not used as a fuel, per se) is then dissolved in fresh molten solvent metal and can either be recovered as pure metal (by reducing the nitrogen pressure and then distilling off the tin) or as actinide oxides. Such oxides can be formed by maintaining an atmosphere of oxygen over a molten metal system containing actinide nitride or dissolved actinide metal, the temperatures employed usually being of the order of about 1000° to 2000° C. Nitrogen gases, when present, must be continuously swept from the system by added oxygen if conversion to actinide oxide is to be complete. The solid actinide oxide formed in this manner can be recovered by mechanical means or by distilling off the tin. This purification method has the obvious advantages of eliminating the long period of radioactive cooling which is now practiced in wet-chemical methods of repurifying such contaminated fuel elements, and it is free of all the disadvantages heretofore associated with pyrometallurgical repurification methods.

The gaseous fission product and decay products which are discharged into the nitrogen atmosphere above the melt can be removed from the system by circulating said atmosphere, or a bleed stream thereof, through a cleanup loop, the latter may include condenser, trap and absorber means which take out essentially all of the impurities from the circulating gas stream. Any impurities which are not removed in this fashion can be separated from the nitrogen residue by the practice of conventional freezing techniques. Suitable absorption media through which to pass the gas to be purified, following a practice of appropriate condensation and condensate-removal steps, include aqueous caustic, acid, activated charcoal and molecular sieves of one type or another.

Referring to the drawings, the equilibrium curves of FIG. 1 have already been discussed above. For a further understanding of the invention as practiced in various of its embodiments, reference may now be had to the additional figures of the drawings wherein.

Figure 2:
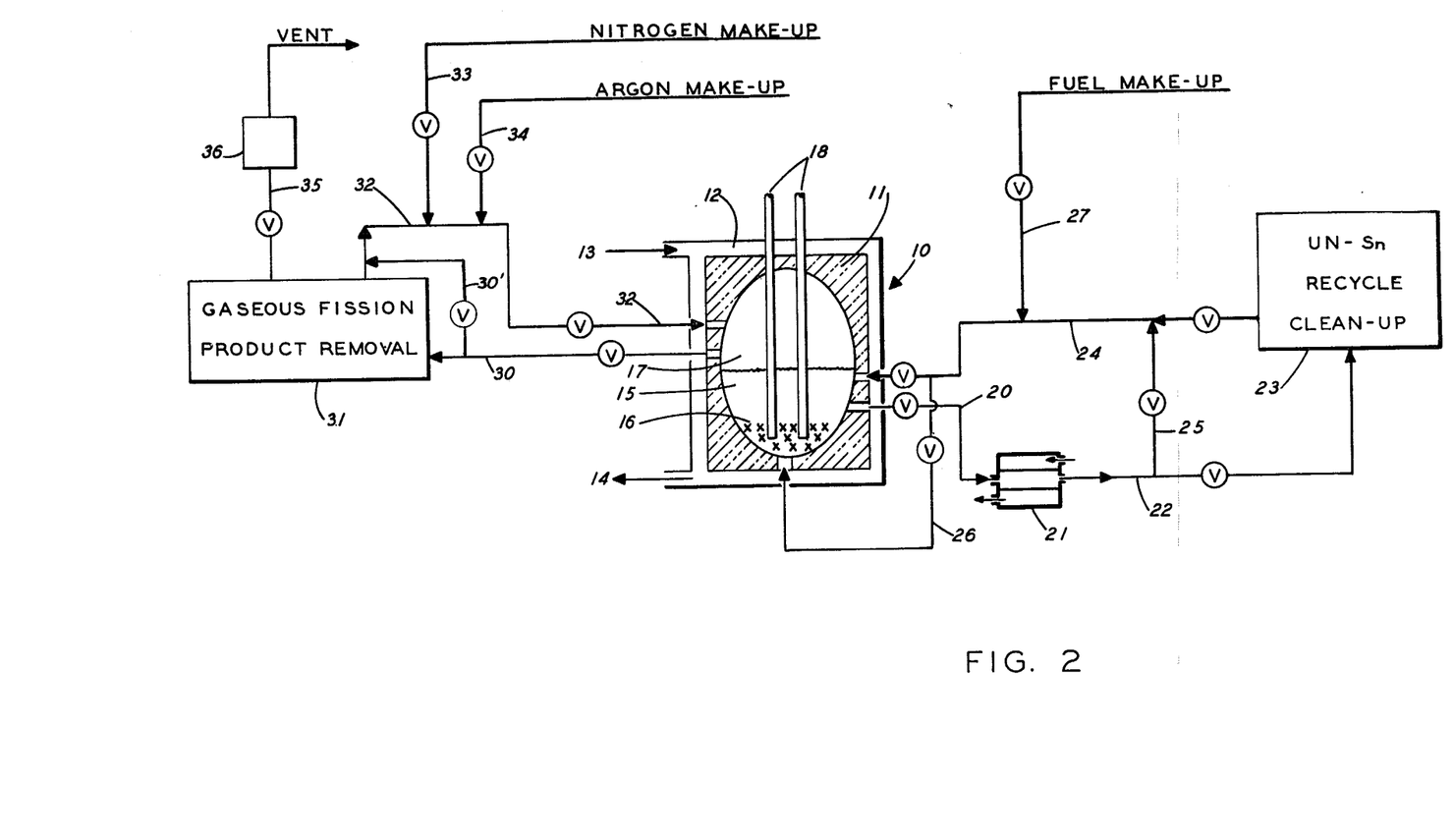
FIG. 2 is a view, partially in section, showing a nuclear reactor vessel of the present invention in one embodiment thereof, together with schematic means presented for removing both metal and gaseous fission products from the system.

Referring specifically to FIG. 2, a nuclear reactor is indicated generally at 10, said reactor having a graphite core 11 and a surrounding heat exchange unit 12 provided with inlet and outlet means 13 and 14, respectively, for the heat exchange fluid. A body 15 of molten tin containing dissolved uranium and fission product metals is contained in the core, while a critical uranium nitride mass 16 rests on the core bottom. The space 17 above the molten tin solution contains a nitrogen or nitrogen-argon atmosphere, and slidably mounted control rods 18 project into the reactor core.

Figure 3:
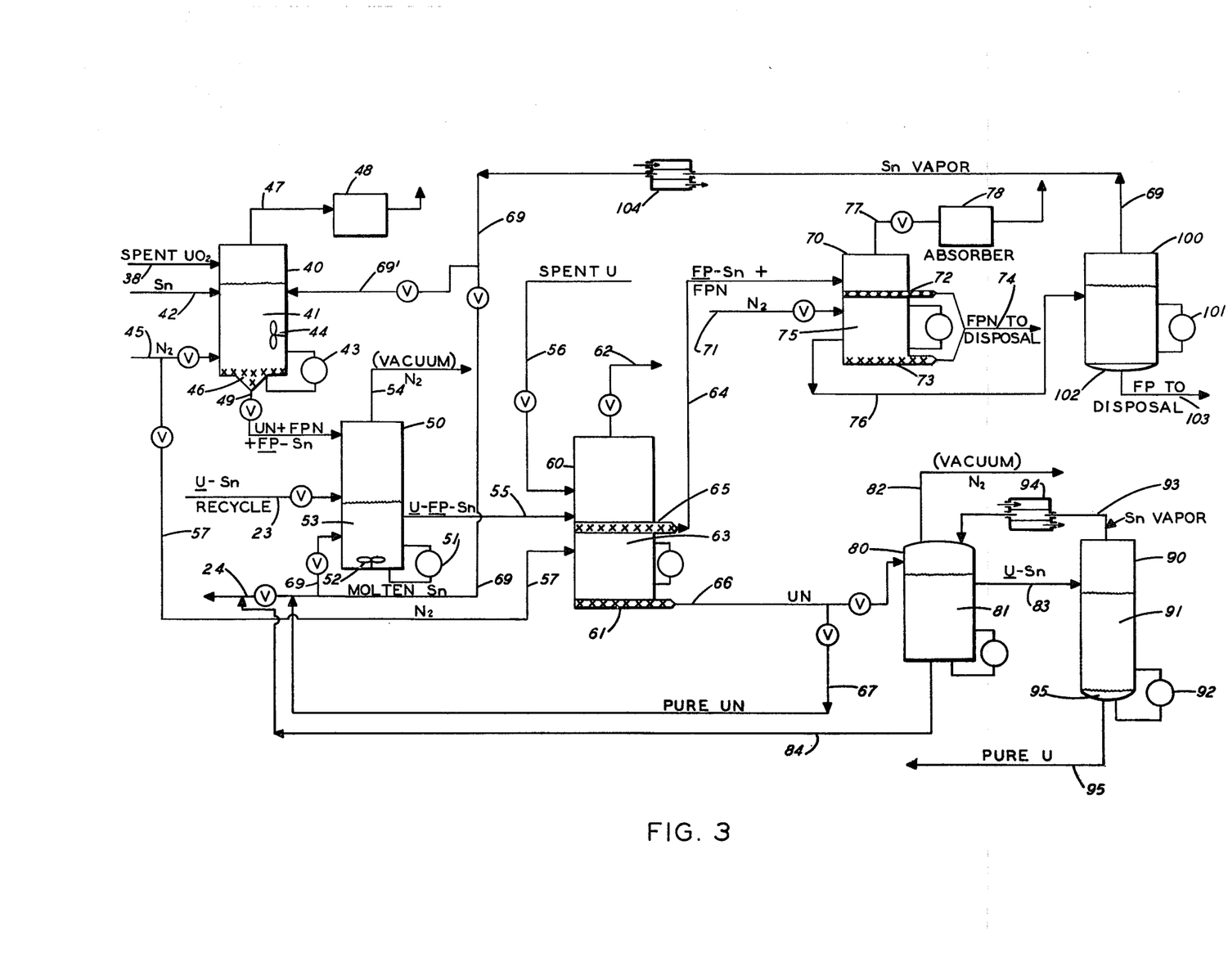
FIG. 3 is a view, generally schematic in nature, of a series of interconnected units for removing metal fission products from one or more of a variety of spent uranium fuels as well as from a solution of uranium in molten tin.

A portion of the molten tin solution 15 is continuously or intermittently withdrawn through line 20 for passage through heat exchanger 21 and then through line 22 to a cleanup zone 23 wherein fission product impurities are removed, as shown in FIG. 3, before the solution is returned to the reactor through line 24. If desired, the cleanup zone 23 can be bypassed by returning the recycle stream through lines 25 and 24 directly to the reactor. A line 26 leading from line 24 into the bottom portion of the core permits part or all of the recycle stream to be directed into the lower portion of the molten tin solution to provide any degree of agitation between the uranium nitride particles and the surrounding molten tin solution, if desired. New uranium fuel or fertile fuel material can be added to the system via line 27 which discharges into the recycle stream in line 24.

The nitrogen atmosphere above the molten tin, supplied through line 32, can be continuously or intermittently withdrawn via line 30 for passage through a gaseous fission product removal zone 31 before being returned to the reactor through said line 32 along with any required makeup nitrogen supplied through line 33 and any argon or other inert gas employed through line 34. A vent gas line 35 leads from the zone 32 through an absorber 36 and into the atmosphere. If desired, the gas leaving the reactor through line 30 need not be passed through zone 31 but can be directed through lines 30' and 32 back to the reactor, reinforced with additional nitrogen and/or argon, as required.

Referring now more particularly to FIG. 3, there is shown a unitary system which is adapted to remove metal fission product impurities from a plurality of spent uranium fuels including uranium and uranium oxide, as well as from the uranium-tin recycle stream removed from reactor 10 through lines 20 and 23. Spent uranium oxide fuel enters the system through line 38 for discharge into a graphite vessel 40 containing a body 41 of molten tin as supplied through lines 42 and/or 69', said body being heated by a reboiler 43 and agitated by a stirring device 44. Nitrogen entering unit 40 through line 45 reacts with uranium oxide and a portion of the fission products present to convert the uranium and said impurities to solid nitride particles which fall to the bottom of the unit as indicated at 46. The nitrogen gas which passes unreacted through the molten tin 41 sweeps with it the carbon monoxide formed during the reaction and passes from vessel 40 through line 47 and absorber 48 to the atmosphere.

The solid nitrides 46, along with molten tin containing dissolved fission product metals, pass through line 49 to a refractory, inert vessel 50. Also directed into the vessel 50, through line 23 as noted above, is the molten tin recycle stream containing dissolved uranium and a variety of fission product impurities, and perhaps some solid UN particles. (If no such solid particles are present, the recycle stream in line 23 can be introduced directly into vessel 60.) Vessel 50, heated by a reboiler 51 and provided with a stirrer 52, operates under a relatively high vacuum and at temperatures above 1485° C. The nitrogen evolved from the metal pool 53 (as nitrides present therein are decomposed to uranium and fission product metals dissolved in the tin) is exhausted through line 54. The molten metal 53 is withdrawn through line 55 for discharge into a graphite vessel 60. At this point it is appropriate to note that spent uranium fuel may be introduced into the system through line 56 which also discharges into vessel 60. Nitrogen is supplied to said vessel through line 57, and the temperature and nitrogen pressure maintained in the vessel are such as to induce precipitation of UN, as indicated at 61. The unused nitrogen gas introduced into vessel 60 is discharged to the atmosphere through line 62. The solution 63 of molten tin in vessel 60, now free of dissolved uranium but containing dissolved fission product metals, is removed from the vessel through line 64 along with any solid zirconium nitride shown at 65 as floating on the solution 63.

The solid UN particles, now free of fission product impurities, are removed from vessel 60 through line 66 by appropriate mechanical means (not shown), and said UN product may either be returned to the reactor through lines 67 and 24, along with molten tin supplied through line 69, or it may be passed to succeeding portions of the unit, i.e., to vessel 80 for conversion to a uranium-in-tin solution or to vessel 90 for conversion to pure uranium, as discussed below.

The fission product-containing molten tin solution discharged into vessel 70 is given a vigorous, relatively high pressure nitriding treatment therein by means of nitrogen supplied through line 71, thereby converting most of the fission product metals present to insoluble nitrides. Some of the latter float on the molten tin body 75, as indicated at 72, while others drop to the bottom of said body, as indicated at 73. All solid nitrides present are then withdrawn from the system through line 74 for ultimate disposal. The unreacted nitrogen supplied to vessel 70 is withdrawn through line 77 and, after passing through absorber 78, is discharged to the atmosphere. The remaining molten metal 75, which contains trace amounts of fission product impurities, is then passed via line 76 to vessel 100 where, by means of reboiler 101, the solution is heated sufficiently to distill the tin overhead through line 69, while the fission products remaining are withdrawn as bottoms through line 103 for disposal. The tin vapors in line 69 are condensed by passage through a condenser 104, and the resultant molten tin is passed through line 69 back to the reactor 10 via line 24, though if desired it can be directed in whole or in part through line 69' to vessel 40, thereby supplementing or replacing the tin supplied to this portion of the assembly through line 42.

The UN particles, as passed through line 66 into an inert refractory vessel 80, encounter therein a mass of molten tin. This portion of the apparatus is kept under vacuum, with the nitrogen evolved from the tin solution being withdrawn through line 82. The ensuing solution 81 of uranium in molten tin can be passed via line 83 to another inert, refractory vessel 90 where the mass 91 of molten metal contained therein is heated by reboiler 92 to distill the tin vapors overhead through line 93. Said vapors are cooled to the molten state by passage through a heat exchanger 94 and the molten tin is then returned to vessel 80. The pool 95 of pure uranium which collects at the bottom of vessel 90 is withdrawn through line 95 for future use either as such or in the form of its oxide. Alternatively, the uranium-in-tin solution 81 in vessel 80 can be recycled back to the reactor via lines 84 and 24, this being the preferred method for returning the uranium removed from the reactor via lines 20 and 23 back to the reactor 10.

In presenting FIGS. 2 and 3 of the drawing, conventional items of equipment such as instrumentation, pumps and certain valves, as well as liquid handling and liquid-solid separating means, have been omitted in the interests of simplicity and of a more ready understanding of the invention. Further, while the present invention has been described with respect to particular embodiments thereof, it is not intended to limit the invention to details of description and illustration. Reference is made to the appended claims for a precise definition of the invention.

We claim:

1. A nuclear reaction process which comprises establishing, in an inert, refractory reactor vessel, a critical fuel system made of at least a mass comprising at least one nitride of an actinide fuel metal in solid form and, in contact therewith, a solution of the actinide fuel metal in a molten tin solvent, said solid actinide nitride fuel being disposed at the bottom portion of the reactor vessel, maintaining the critical fuel system so that fission continuously occurs, dissolving the metal fission products in said tin solution at a concentration below a critical level, maintaining the fuel system under an atmosphere of nitrogen under conditions of nitrogen pressure ranging from about 0.02 to about 2 atmospheres and of temperatures ranging from about 300° C. to 2000° C. sufficient to precipitate from solution an amount of actinide fuel nitride substantially equal to the loss of actinide fuel metal nitride from fission occurrence.

2. The process of claim 1 wherein the fuel system is in graphite containment and wherein a portion of the molten tin solution so contained is withdrawn from the reactor vessel as the fission process continues, is freed of metal fission product contaminants present therein and is then returned to the reactor vessel.

3. The process of claim 2 wherein removal of the metal fission product impurities include the additional steps of separating said at least one actinide fuel nitride from the residual molten tin solution; further subjecting the latter solution to nitrification under conditions of temperature and nitrogen pressure to effect separation, in solid nitride form, of substantially all nitride-forming metal fission products present in the solution; removing said solid fission product nitrides from the solution; and returning the remaining treated molten tin solution and the separated actinide fuel nitrides as a mixture to the reactor vessel.

4. The process of claim 1 wherein the last-mentioned molten tin actinide fuel nitride mixture is maintained at temperatures ranging between about 1485° C. and 2000° C. and under a low nitrogen pressure to convert the mixture to a solution of actinide metal fuel in the molten tin before being returned to the reactor vessel.

5. The process of claim 1 wherein the actinide is uranium.

6. The process of claim 1 in which the weight ratio of tin solution to actinide nitride is at least three to one.

7. The process of claim 1 in which the dissolved actinide fuel metal is at a concentration no greater than 20% of the tin solution.

* * * * *